United States Patent [19]

Mallow

[11] 4,424,867

[45] Jan. 10, 1984

[54] HEAT HARDENING SEALANT-GEL FOR FLEXIBLE COUPLINGS

[75] Inventor: William A. Mallow, San Antonio, Tex.

[73] Assignee: Fiberglas Canada Inc., Canada

[21] Appl. No.: 249,629

[22] Filed: Mar. 31, 1981

[51] Int. Cl.³ .............................................. A62C 1/00
[52] U.S. Cl. ...................................... 169/43; 52/221; 156/48; 169/48; 174/48; 174/121 A; 174/138 F
[58] Field of Search .................... 52/743, 221; 156/48; 169/43, 48; 174/48, 121 A, 135, 138 F; 252/606; 339/20

[56] References Cited

U.S. PATENT DOCUMENTS

| | | |
|---|---|---|
| 287,346 | 10/1883 | Van Depoele . |
| 1,049,005 | 12/1912 | Steinmetz . |
| 1,655,718 | 1/1928 | Weiss et al. . |
| 1,847,663 | 3/1932 | Spencer . |
| 1,895,898 | 1/1933 | Robinson . |
| 1,946,331 | 2/1934 | Reeves . |
| 2,065,757 | 12/1936 | Scott . |
| 2,168,757 | 8/1939 | Baillard et al. ................. 156/48 X |
| 3,109,053 | 10/1963 | Ahearn . |
| 3,576,940 | 5/1971 | Stone et al. . |
| 3,707,385 | 12/1972 | Kraemer et al. . |
| 3,741,898 | 6/1973 | Mallow et al. . |
| 3,864,883 | 2/1975 | McMarin . |
| 3,869,132 | 3/1975 | Taylor et al. . |
| 3,976,825 | 8/1976 | Anderberg . |
| 3,990,903 | 11/1976 | Mallow . |
| 3,995,102 | 11/1976 | Kohaut . |
| 4,018,983 | 4/1977 | Pedlow ........................... 252/606 X |
| 4,061,344 | 12/1977 | Bradley et al. . |
| 4,066,463 | 1/1978 | Chollet . |
| 4,104,073 | 8/1978 | Koide et al. ..................... 252/606 X |
| 4,118,325 | 10/1978 | Becker et al. . |
| 4,175,311 | 11/1979 | Bunyan ............................... 52/743 |

FOREIGN PATENT DOCUMENTS

| | | |
|---|---|---|
| 91490 | 2/1904 | Canada . |
| 325562 | 8/1932 | Canada . |
| 4625881 | 1/1950 | Canada . |
| 667391 | 7/1963 | Canada . |
| 798212 | 11/1968 | Canada . |
| 871027 | 5/1971 | Canada . |
| 995778 | 8/1976 | Canada . |
| 1045614 | 1/1979 | Canada . |

OTHER PUBLICATIONS

PCT Application WO 80/02086, Pedlow.
Standard Methods of Fire Tests of Buildings Construction and Materials, Designated E 119-73, pp. 610 to 627.

*Primary Examiner*—Leland A. Sebastian
*Attorney, Agent, or Firm*—Stevens, Davis, Miller & Mosher

[57] ABSTRACT

This specification discloses a means for providing a barrier against the passage of fire through that portion of a wall aperture surrounding an electrical conduit, pipe, or the like. This is accomplished by placing a sleeve around that portion of the conduit passing through the wall, which sleeve is the central portion of an envelope which is anchored peripherally to the wall or to a more or less rigid material blocking the aperture through the wall and which sleeve connects to end portions of the envelope, each of which end portions extends to connect with the conduit on an opposite side of the wall. The annular region between the conduit and the surrounding envelope is filled with an intumescent gel. The boot is flexible and capable of some movement to compensate for thermal expansion, vibration or other forces during the life of the installation. In the event of heat and fire, the gel within the envelope intumesces, providing protection against passage of flames and gas through the annular region surrounding the conduit, which annular region is now occupied by a fire resistant mass formed by the solidification of the gel. The intumescible gel comprises sodium silicate solution, a filler, and a hardener.

26 Claims, 4 Drawing Figures

HEAT HARDENING SEALANT-GEL FOR FLEXIBLE COUPLINGS

This invention relates to an improvement in fire protection for buildings having rooms separated by walls in which are apertures for electrical transmission cables and other supply lines. More specifically, it relates to placement of an intumescent material into the annular region between the periphery of a wall aperture and a cable or pipe passing through the aperture.

Electrical conduits and plumbing often pass from room to room through apertures or portals cut or molded into partitions and walls. The aperture space surrounding such conduits or pipes must often be filled to provide a complete barrier between rooms for purposes related to fire spread and containment. It is often necessary to provide a mechanism allowing for some movement or vibration of the conduit or plumbing as well as accessibility thereto, while not allowing for disturbance of the peripheral barrier which would render the closure ineffective in fire containment.

It is known to provide an elastomeric sleeve around the electrical or plumbing component so as to provide a sealing effect in the aperture.

This is accomplished in certain installations by encapsulating the conduit in a flexible envelope, having a central sleeve portion and connecting end portions. The annular region between the envelope and the conduit is filled with a flexible sealant. The central sleeve portion of the envelope is anchored peripherally to the barrier or filler material, but the enclosed conduit can be moved relative to the envelope since the envelope is flexible and is attached mechanically or adhesively to the conduit only at its end portions. In the event of a service failure necessitating replacement or repair of the encapsulated conduit, the end portions of the envelope can be detached from the conduit and the conduit removed without disturbing the barrier material. In addition, the liquid state of the sealant between the envelope and the conduit allows for considerable movement of the conduit within the envelope arising from thermal expansion, vibration or other forces.

In the prior art it is known to fill an elastomer envelope with a fire resistant material such as silicone rubber. This entails problems in that although silicone itself is fire resistant, silicone rubber is not resistant to destruction by fire, and in due time will flow or burn away, permitting fire transfer through the void.

One well-known type of sealing system for holes in walls and floors involves encapsulating the pipe or cable in a sealing medium in the aperture, which medium consists of silicate foam. While this is helpful, it may not completely seal off the aperture in the event of fire, if vibration or other movement has created passages through the sealing medium adjacent the pipe or cable, or if the fire completely consumes the cable which permits gases to pass through the resultant opening. In the case of a vertical wall, a damming or retaining plate of fire retardant board is provided on each side of the perforated wall, thus forming an enclosure into which foaming material such as silicate foam is poured and allowed to harden in place. A more flexible material such as a silicone foam may be employed.

In the case of a horizontal installation such as a floor, the retaining plate is applied across the bottom of the hole only and the foaming material is poured in on top, to harden in place. A typical silicone foam system involves the use of Dow Corning 3-6548 RTV silicate foam. This material vulcanizes at room temperature, pours into penetration cavities and flows around the elements in the cavity, then expands to make a tight fit between them and the enclosing walls of the cavity.

The fire insulating properties of silicates have been known for a great many years. U.S. Pat. No. 287,346 which was granted in 1883 indicates that it was well-known even at that time "to use paper treated with a silicate for insulating purposes".

Intumescent silicate compositions are also well-known in the art. For instance, U.S. Pat. No. 1,049,005, which was granted in 1912, indicates that soapstone or talc is a hydrated silicate of magnesia, which when fired gives up water of hydration and forms a hard, stony mass known at that time as lava to those in the electrical field.

U.S. Pat. No. 1,655,718, granted to Weiss et al. in 1928, discloses that when an intumescent binder such as soluble alkali silicate is mixed with a filler and subjected to the action of heat, the mass expands or puffs up and ultimately hardens into a firm strong body filled with air cells. That patent states that unless the expansion or puffing of the material is restricted to a closed mold or form, the expansion is likely to proceed so far that the resultant wallboard product will be too light and frothy to be of practical use.

Use of silicate materials for the imparting of fire resistance to cables and cable coatings is well-known; for instance, such use is disclosed in U.S. Pat. Nos. 1,895,898; 1,946,331; and 3,109,053.

U.S. Pat. No. 3,707,385, granted on Dec. 26, 1972 to Kraemer and Seidl, discloses the use of an alkali metal silicate and filler for addition to a paint binder, which addition in the event of a fire foams when exposed to the fire to produce an insulation barrier.

U.S. Pat. No. 3,576,940 of Stone et al discloses means of protecting an insulated conductive electric wire by means of layers of silicone rubber, glass fiber, silicone rubber, and finally a braided asbestos impregnated with an intumescent material. As shown in Column 3, line 35, the intumescent material in the asbestos when subject to open flame temperatures swells and forms a thermal insulating fire retardant barrier between the flame and the layers of insulating material underneath. The specification discloses the use of several different intumescent materials or compounds in Columns 3 and 4. Among these is shown sodium silicate. However, the patent teaches away from the use of sodium silicate on the basis that the material is soluble in water and thus has limited utility as an intumescent compound to impregnate the asbestos according to the invention.

Canadian Patent No. 1,045,614 of Bradley et al. discloses a fitting that may be secured through an aperture in a fire rated barrier. Intumescent material is used in the fitting which comprises in part layers of hydrated sodium silicate.

There are many prior patents disclosing various formulations for sodium silicate together with a hardener, for example my prior U.S. Pat. No. 3,990,903 of Nov. 9, 1976.

All of the above stated items of prior art, and all prior art known to the applicant, involves disadvantages in installation and use, as well as involving very considerable costs.

Reference is made to ASTM "Standard Methods of Fire Tests of Building Material, Construction and Materials", designated E119-73, pages 610 to 627, for details of testing procedures and standards. The ASTM standard is incorporated herein by reference.

SUMMARY OF THE INVENTION

The present invention relates to a novel structure for imparting increased fire resistance to a seal in a wall or partition, through which passes a cylindrical material such as a cable, tube, or the like. In accordance with the present invention, there is provided a method of imparting increased fire resistance to a partition in connection with installation of a conduit through an aperture in the partition, comprising the steps of providing a flexible envelope to surround the conduit and to extend longitudinally along the conduit at least from one side of the partition to the other, the diameter of the flexible envelope being such that it fills the aperture, and filling the envelope with an intumescible liquid.

In another aspect the present invention provides a structure adapted to provide a fire resistant seal between a conduit and a partition through which the conduit passes, comprising a flexible envelope surrounding the conduit and extending longitudinally along the conduit at least the distance of the thickness of the partition, the envelope being filled with an intumescible liquid, and the envelope having a diameter sufficient to fill the aperture in the partition so as to provide a flexible permanent seal between the conduit and the partition. The envelope may be formed from either a single piece of molded elastomeric material or from a sleeve of metal or similar material to each end of which is connected a molded elastomeric boot.

In another aspect the invention provides such a method and structure wherein the liquid is a thixotropic silicate slurry, comprising an aqueous sodium silicate solution, a glycol, a polyvalent metal oxide or hydroxide, and a thixotropic agent.

In another aspect the invention provides a method wherein the liquid is a slurry composition that gels at temperatures above 150° F., with subsequent foaming and hardening, comprising sodium silicate (39.2% to 39.8% by weight) solution of 42° Baume, (3.22/1 ratio $SiO_2/NaO_2$), calcium carbonate, bentonite clay, and zinc oxide.

In another aspect the invention provides a method wherein the liquid is a slurry composition that foams at temperatures above 250° F., with subsequent hardening, comprising sodium silicate (39.2% to 39.8% by weight) solution of 42° Baume, (3.22/1 ratio $SiO_2/NaO_2$), calcium carbonate, bentonite clay, and aluminum hydroxide.

In another aspect the invention provides a method wherein the liquid is a slurry composition that foams at temperatures above 400° F., with subsequent hardening, comprising sodium silicate hydrate powder, (2/1 to 3.22/1 ratio $SiO_2Na_2O$), glycerol, calcium carbonate, zirconium oxide, and bentonite clay.

DESCRIPTION OF THE PREFERRED EMBODIMENTS

The present invention preferably envisages the use of a thixotropic silicate slurry in a flexible envelope surrounding a heat or fire sensitive electrical, mechanical or plumbing component. The slurry is tailored to remain semi-liquid or viscoelastic at specific normal temperature ranges, up to a certain predetermined temperature. The slurry can be tailored to intumesce and solidify about the conduit component in the event of a fire or upon exposure to temperatures in excess of those for which the slurries were tailored to remain liquid. The flexible envelope is provided to be of such a dimension that it will, when placed under pressure from the heat sensitive liquid within, form a tight fit with an aperture in a partition through which the conduit passes.

The flexible envelope may consist of a metal or elastomeric rigid tubular sleeve placed through the partition during its construction, to each end of which sleeve is attached an elastomeric boot which also connects to the conduit. The elastomer is preferably a material such as No. 164 Fiber Glass Reinforcing Fabric impregnated with phenylmethyl vinyl silicone. However, any materials could be utilized having enough fire resistance to sustain the first 30–45 minutes of fire test providing sufficient containment of the gel to allow rigidization.

Each of the boots are connected to the sleeve and to the conduit by high temperature cement and stainless steel straps.

Alternatively, the flexible envelope may be formed from a single length of cylindrical elastomeric material in which a central portion is the sleeve and in which the end portions are integral with the central portion. The end portions are connected to the conduit by high temperature cement and stainless steel straps.

Currently, flexible envelopes are being developed having a standard size that can be adapted to fit various size apertures.

In some cases, the invention is envisaged as consisting of an envelope containing the liquid and attached to the conduit, pressing against a circular aperture in a partition such as a wall or floor. In other cases, it is envisaged as consisting of one or more such envelopes passing through a relatively large aperture in a partition, with a more or less rigid insulating filler material occupying the space between any such envelopes and the wall of the partition itself. This insulating filler material could suitably, for example, constitute a rigid silicate foam. It could also suitably be a silicone foam, or a silicate binder—inorganic and syntatic-filled barrier, or a lightweight inorganic cement, or one of a number of other similar fire barriers.

The present invention thus will provide a latent fire protection for conduits passing through a partition or the like, permitting movement of accessibility to repair or replacement of the encapsulated components. In some cases the slurry also affords protection against corrosion by virtue of the alkaline silicate composition.

It is as stated above possible to tailor the composition including the choice of hardener, so as to be activated and hardened at different temperatures for different end uses.

Under normal operating conditions, the gel retains its flexible, liquid properties at all temperatures below a selected activation temperature threshold. Different recipes are available for different operating temperatures. They include:

(1) Zinc oxide for an activation temperature threshold of 150° F. See basic Formulation A.
(2) Aluminum hydroxide for an activation temperature threshold of 250° F. See basic Formulation A below.
(3) Zirconium oxide for an activation temperature threshold of 400° F. See basic Formulation B below.

In each of these recipes the gel or slurry remains fluid at temperatures below the activation threshold. As the temperatures rise above these levels, reaction begins, thickening proceeds, viscosity rises, and the material alternately sets hard depending upon the time and temperature limitation.

| | Parts By Weight |
|---|---|
| Formulation A | |
| Sodium silicate (39.2% to 39.8% by weight) solution - (42° Baume, 3.22/1, silica/sodium oxide ratio, 40% solution preferred) | 100 |
| Bentonite | 3 |
| Calcium carbonate | 100 |
| Zinc oxide or aluminum hydroxide | 15 |
| Formulation B | |
| Sodium silicate hydrate powder - 18% to 20% water of hydration - (2/1 to 3.22/1 ratio SiO$_2$Na$_2$O) | 100 |
| Glycerol | 100 |
| Water | 5–10 |
| Zirconia | 15 |
| Cab-O-Sil (trade mark) for thixotropic property | 1–5 |

Bentonite is a colloidal clay (aluminum silicate) containing montmorillonite, which forms a colloidal suspension in water with strongly thixotropic properties.

Cab-O-Sil is an amorphous, pyrogenic silicon oxide of very small particle size (fraction of a micron) and very low bulk density (~0.5 pcf. as obtained). It is utilized for a number of functions such as rheological control (thickening, gelling, fluidizing, etc.) catalysis, adsorption, absorption, etc. The silica is potentially very reactive with alkali and some acids and can greatly enhance the handling characteristics of sealants, adhesives, caulks, etc. Cab-O-Sil offers thixotropic properties to the gel, assuring a stable placement at rest and allowing fluidity and mobility under agitation.

Formulation B is generally usable at higher temperatures which would otherwise exert great vapor pressure on the aqueous Formulation A.

In a typical practice the gel remains mobile and the envelope retains the gel intact until a fire occurs. In such event, one of the elastomeric end portions of the envelope first is heated, then pyrolized by exposure to heat and flame while the contents of the envelope are also being heated. With the continuing heating, the gel becomes first more fluid, then its viscosity rises to a semisolid, visoelastic mass which, upon continued heating, both intumesces and solidifies to a hard mass of insulative cement.

In simulated fire tests, after the end portion of the envelope was burned away in the furnace assembly, the porous, strong, solid mass formed by its contents protected the enclosed conduit for three hours. The external heat source temperature was 1700° to 2100° F., while the surface of the conduit did not exceed 300° F.

The gel was tested and demonstrated at Southwest Research Institute to staff personnel in three separate fire tests following the ASTM E119 procedure. A large (15 ft. by 15 ft.) concrete slab was used to house various penetrating assemblies, simulating a nuclear or utility penetration area through which electrical and plumbing components traversed. The penetration areas were filled with a rigid, 20-pound per cubic foot foam based upon a sodium silicate recipe (U.S. Pat. No. 3,741,898) used to surround and insulate the components of the penetration. An elastomeric boot was adapted to a 4-ft. diameter pipe penetration and said boot was filled with the intumescent gel compound of Formulation A of this application. The recipe was tested in each of the three full-scale ASTM E119 tests while Formulation B was applied to a smaller scale version of the same test. In all tests, a three-hour burn is applied with peak temperatures of approximately 2100° F. during the major portion of the three-hour period.

The lower exposed portion of the boot and pipe were inspected and photographed and found to have performed as designed. The intumesced and hardened gel recipe protected the annulus from gas or flame transmission into and through the foam seal. The elastomer burned away in less than 15 minutes and exposed an expanding, viscoelastic mass of off-white gel which increased in diameter about twofold. The expansion and hardening appeared complete within 30–40 minutes, as well as could be estimated visually through the view port into the furnace area. The hot, expanded mass survived a quenching spray of water and a solid stream hose test with no effects. The surface of the concrete structure spalled and flaked away badly in the hose stream.

Figure 1:
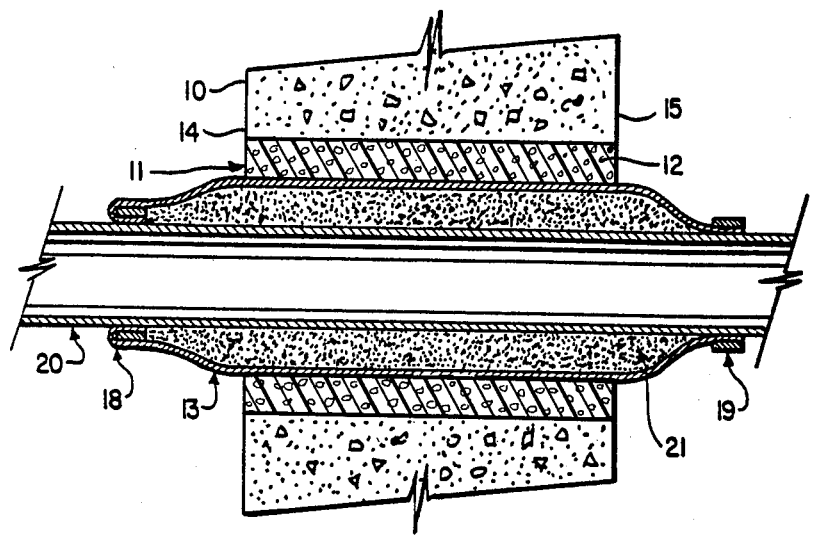
FIG. 1 is a cross-sectional view of a conduit mounted in a partition using the flexible envelope of this invention.

In FIG. 1, partition or wall 10 having an aperture 11 is shown in a cross-sectional view, the aperture being partly filled with a filler material, such as rigid silicate foam, 12. A flexible envelope 13, generally formed of a strong elastomeric material (such as No. 164 Fiber Glass Reinforcing Fabric impregnated with phenylmethyl vinyl silicone) lies within the barrier filler material 12, and extends beyond the opposite sides 14 and 15 of the wall 10. The envelope is secured at each end 18, 19 to the conduit 20 which is enclosed by a steel strap or other securing means, one end of the envelope being folded back over that part of itself secured to the conduit by the mechanical or adhesive securing means. Conduit 20 may be an electric wire, a plumbing pipe, a tube, a cable, or something of the sort. It may be flexible or rigid. The flexible envelope 13 is filled with an intumescible gelled liquid 21 under sufficient pressure to maintain the flexible envelope 13 closely against the filler material 12.

Figure 2:
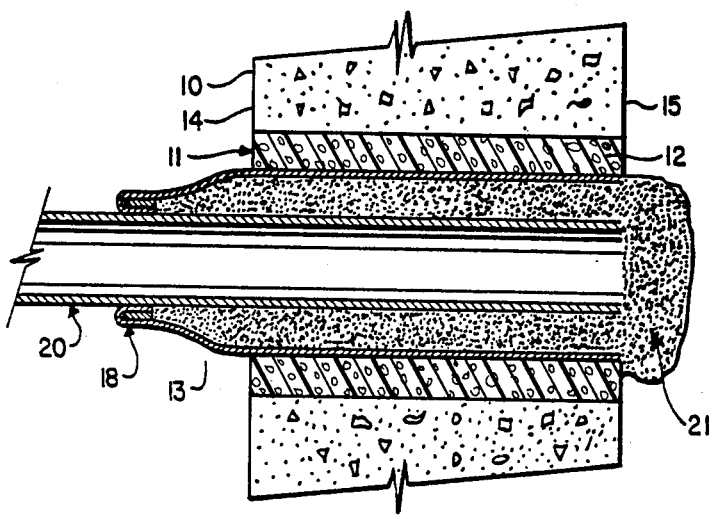
FIG. 2 is a cross-sectional view as in FIG. 1, but shown subsequent to a fire.

FIG. 2 illustrates the same arrangement as in FIG. 1, but subsequent to a fire. After a fire has taken place on the one side of the partition 10, the elastomeric end of the envelope on that side weakens and burns or melts away in due course. Before this happens to an extent that any leakage of gases or flame can extend along the interface between the envelope and the filler material 12, the silicate gel which is exposed to the heat and flame expands and intumesces. The hardener is activated at a suitably high temperature, hardening the resulting foam in place. This forms a fire resistant block preventing the transfer of fire, flames, fumes, smoke and the like through the aperture. Such foam as it expands is also forced into the crevice in the conduit which results from the burning of such conduit, cable or wire.

Thus in one embodiment the inventive concept relies on the presence in an aperture in a wall of an elastomeric envelope sealed at both ends around a cable or other conduit and containing a sealed permanent flexible hydrous gel comprising an alkali metal silicate, filler, calcium carbonate and hardener. In other embodiments the composition of the gel will be varied for specific applications.

Figure 3:
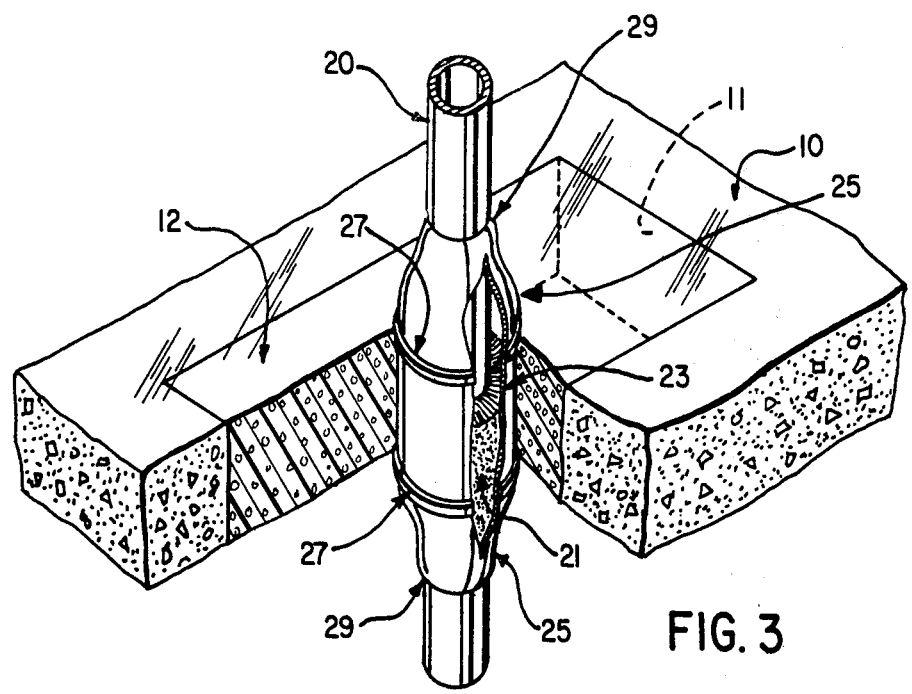
FIG. 3 is a perspective view of another embodiment of this invention, in which the envelope has a central sleeve portion with attached end boots.

FIG. 3 illustrates a second type of flexible envelope. Partition or wall 10 having an aperture 11 is shown in a perspective view, the aperture being partly filled with the rigid silicate foam 12. A rigid, tubular sleeve 23 of metal or elastomeric material has end boots 25 connected thereto by steel straps 27. One end of each boot is secured to the conduit by a steel strap or other securing means with the boot then being reversed over the strap prior to the other end of the boot being secured to the sleeve. The boots are formed of a strong elastomeric material such as No 164 Fiber Glass Reinforcing Fabric impregnated with phenylmethyl vinyl silicone. Conduit 20 may be an electric wire, a plumbing pipe, a tube, a cable, or something of the sort, and may be flexible or rigid. Intumescible gelled liquid 21 is placed within sleeve 23 and attached boots 25.

Figure 4:
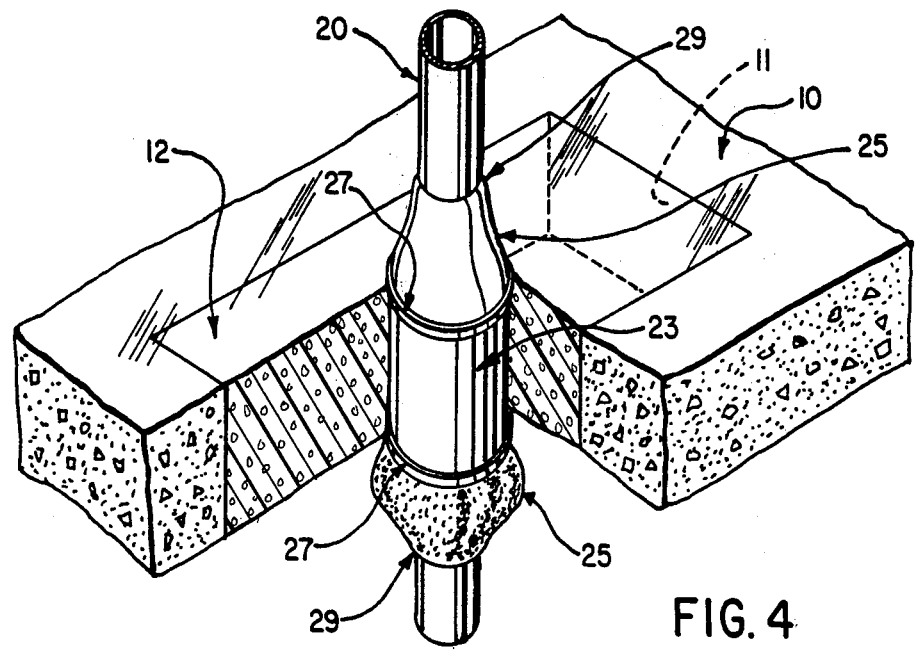
FIG. 4 is a cross-sectional view as in FIG. 3 but shown subsequent to a fire.

FIG. 4 illustrates the effect of exposure of the lower portion of the gel-filled boot to fire. The exposed elastomeric covering 25 has been burned away and in the process the gel has undergone transformation from a viscoelastic liquid to a viscoelastic solid. Upon evaporation of the water of hydration from the viscoelastic solid, the exposed gel has intumesced and hardened, providing protection to the enclosure and preventing further damage or flame exposure beyond the transition area marked by the clamp 27 above which the sealant 12 offers a barrier against flame penetration. The intumesced and hardened gel has been demonstrated to withstand direct water impingement in the solid stream hose test following removal of the fixture from the furnace while the fixture is still quite hot. In smaller laboratory tests, water quenching of an 1800° F. mass of intumesced gel did not induce spalling or structural failure.

In practice, some of the apertures involved in this type of work are very large, some round apertures measuring as much as 1 to 10 feet across and passing through a floor or wall in a large wiring installation, such as a telephone exchange. As mentioned previously, rigid silicate foam would be secured into such large apertures and the flexible envelope placed through an aperture in the rigid silicate foam. In other envisaged applications, there will be a slot-shaped aperture approximately 3 by 1½ feet across. Other much smaller apertures of course are found in other applications.

In order to avoid long-term drying out of the hydrated silicate gel, it is important to avoid conditions which will dry out the gel. For example, for permanent installation it is advisable to ensure that the envelope is securely sealed to the adjacent conduit portion at each end of the envelope, to avoid loss of water through drying, leakage, and the like.

The present invention provides definite advantages over the prior art envelopes which were filled with silicone rubber or the like. The silicone rubber in previous use would eventually burn through without creating any bulky and fireproof barrier to flame transmission. The present invention on the other hand provides a bulky, flame-resistant, firm and nonpenetratable material which acts to prevent any transfer of flame and gases through the aperture.

In many cases the silicate gel may contain a filler which also serves as a latent heat-activated hardener, reacting with sodium silicate or the like to achieve hardening under fire, and to hold in place whatever conduits such as electrical components or the like are present, holding them in a heat shielding insulative coating. Typical compositions for the gel would include sodium silicate and calcium carbonate in approximately equal amounts, together with hydrated alumina, calcined alumina, zinc ozide, or zirconia in about 15 parts by weight based on the weight of sodium silicate solution. In many cases the filler may be chosen from calcium carbonate, kaolin, talc, titania, silica, wollastonite, and the like.

Among typical hardeners which act to harden the silicate foam upon reaching an activation temperature could be included in the following, some of which of course are also named as fillers: calcium carbonate, calcium phosphates, zinc oxide, magnesium phosphate, calcium silicates, aluminum trihydrate, hydrated alumina, calcined alumina, zirconia, and other polyvalent metal salts and oxides.

The embodiments of the invention in which an exclusive property or privilege is claimed are defined as follows:

1. A method of imparting increased fire resistance to a partition in connection with passage of a conduit through an aperture in the partition, comprising the steps of
   imbedding a rigid tubular sleeve in a partition to extend therethrough,
   placing a conduit through said sleeve,
   securing the ends of said sleeve to said conduit by means of flexible boots, and
   filling said sleeve and boots with an intumescible thixotropic silicate slurry comprising an aqueous sodium silicate solution, a glycol, a polyvalent metal oxide or hydroxide, and a thixotropic agent.

2. A method of imparting increased fire resistance to a partition in connection with passage of a conduit through an aperture in the partition, comprising the steps of
   providing a partition having an aperture therein,
   providing a conduit through said aperture,
   providing a flexible envelope to surround said conduit and to extend longitudinally along said conduit at least from one side of said partition to the other, the diameter of said envelope being such that it fills said aperture, and
   filling said aperture with an intumescible thixotropic silicate slurry comprising an aqueous sodium silicate solution, a glycol, a polyvalent metal oxide or hydroxide, and a thixotropic agent.

3. A structure providing a fire-resistant seal between a conduit and a partition through which the conduit passes, comprising
   a rigid tubular sleeve imbedded in a partition having a conduit to extend therethrough,
   a flexible boot connecting each end of said sleeve to said conduit, and
   an intumescible thixotropic silicate slurry comprising an aqueous sodium silicate solution, a glycol, a polyvalent metal oxide or hydroxide, and a thixotropic agent between said conduit and said boots, so as to provide a flexible permanent seal between said conduit and said partition.

4. A structure providing a fire-resistant seal between a conduit and a partition through which the conduit passes, comprising
   a flexible envelope surrounding a conduit in a partition and extending longitudinally along said conduit at least the distance of the thickness of said partition, said envelope being filled with an intumescible thixotropic silicate slurry comprising an aqueous sodium silicate solution, a glycol, a polyvalent metal oxide or hydroxide, and a thixotropic agent, and said envelope having a diameter sufficient to fill said aperture in said partition so as to provide a flexible permanent seal between said conduit and said partition.

5. A method as in claim 1, wherein the aperture in the partition is defined by a rigid fire resistant filler material installed in the partition.

6. A method as in claim 2, wherein the aperture in the partition is defined by a rigid fire resistant filler material installed in the partition.

7. A method as in claim 5 or 6, wherein the rigid filler material is a rigid silicate foam.

8. A method as in claim 1 or 2, wherein said polyvalent metal oxide or hydroxide is chosen from zinc oxide, aluminum hydroxide and zirconium oxide.

9. A method as in claim 1 or 2, wherein the filler is chosen from bentonite and amophous pyrogenic silicon oxide.

10. A method of imparting increased fire resistance to a partition in connection with passage of a conduit through an aperture in the partition, comprising the steps of
  imbedding a rigid tubular sleeve in a partition to extend therethrough,
  placing a conduit through said sleeve,
  securing the ends of said sleeve to said conduit by means of flexible boots, and
  filling said sleeve and boots with an intumescible thixotropic silicate slurry composition that foams at temperatures above 150° F., with subsequent hardening, comprising sodium silicate (39.2% to 39.8% by weight) solution of 42° Baume, (3.22/1 ratio $SiO_2/NaO_2$), calcium carbonate, bentonite clay, and zinc oxide.

11. A method of imparting increased fire resistance to a partition in connection with passage of a conduit through an aperture in the partition, comprising the steps of
  imbedding a rigid tubular sleeve in a partition to extend therethrough,
  placing a conduit through said sleeve,
  securing the ends of said sleeve to said conduit by means of flexible boots, and
  filling said sleeve and boots with an intumescible thixotropic silicate slurry comprising a slurry composition that foams at temperatures above 250° F., with subsequent hardening, comprising sodium silicate (39.2% to 39.8% by weight) solution of 42° Baume, (3.22/1 ratio $SiO_2/NaO_2$), calcium carbonate, bentonite clay, and aluminum hydroxide.

12. A method of imparting increased fire resistance to a partition in connection with passage of a condduit through an aperture in the partition, comprising the steps of
  imbedding a rigid tubular sleeve in a partition to extend therethrough,
  placing a conduit through said sleeve,
  securing the ends of said sleeve to said conduit by means of flexible boots, and
  filling said sleeve and boots with an intumescible thixotropic silicate slurry composition that foams at temperatures above 400° F., with subsequent hardening, comprising hydrated sodium silicate powder (2/1 to 3.22/1 ratio $SiO_2/Na_2O$), glycerol, calcium carbonate, zirconium oxide, and bentonite clay.

13. A method as in claim 10 wherein the parts by weight of the slurry composition are in the ranges of:
  a. about 50–100 parts sodium silicate solution
  b. about 50–100 parts calcium carbonate powder
  c. about 3–10 parts bentonite powder
  d. about 10–20 parts zinc oxide
  e. about 0–10 parts water.

14. The method as in claim 11 wherein the parts by weight of the slurry composition are in the ranges of:
  a. about 50–100 parts sodium silicate solution
  b. about 50–100 parts calcium carbonate
  c. about 3–10 parts bentonite
  d. about 10–20 parts aluminum hydroxide
  e. about 0–20 parts water.

15. A method as in claim 12 wherein the parts by weight of the slurry composition are in the range of:
  a. 50–100 parts sodium silicate hydrate powder
  b. 50–100 parts glycerol
  c. 20–100 parts zirconium oxide
  e. 3–10 parts bentonite
  f. 0–20 parts water.

16. The method as in claim 13 wherein the parts by weight of the slurry composition include about 100 parts sodium silicate solution, about 100 parts calcium carbonated powder, about 5 parts bentonite powder, about 15 parts zinc oxide, and about 10 parts water.

17. The method as in claim 14 wherein the parts by weight of the slurry composition include about 100 parts sodium silicate solution, about 100 parts calcium carbonate, about 5 parts bentonite, about 15 parts aluminum hydroxide, and about 10 parts water.

18. The method as in claim 15 wherein the parts by weight of the mixture include 100 parts sodium silicate hydrate powder, about 50 parts glycerol, about 50 parts calcium carbonate, about 15 parts zirconium oxide, about 5 parts bentonite, and about 15 parts water.

19. A structure providing a fire-resistant seal between a conduit and a partition through which the conduit passes, comprising
  a rigid tubular sleeve imbedded in a partition having a conduit to extend therethrough,
  a flexible boot connecting each end of said sleeve to said conduit, and
  an intumescible thixotropic silicate slurry comprising a slurry composition that foams at temperatures above 150° F., with subsequent hardening, comprising sodium silicate (39.2% to 39.8% by weight) solution of 42° Baume, (3.22/1 ratio $SiO_2/NaO_2$), calcium carbonate, bentonite clay, and zinc oxide between said conduit and said boots, so as to provide a flexible permanent seal between said conduit and said partition.

20. A structure providing a fire-resistant seal between a conduit and a partition through which the conduit passes, comprising
  a flexible envelope surrounding a conduit in a partition and extending longitudinally along said conduit at least the distance of the thickness of said partition, said envelope being filled with an intumescible thixotropic silicate slurry composition that foams at temperatures above 150° F., with subsequent hardening, comprising sodium silicate (39.2% to 39.8% by weight) solution of 42° Baume, (3.22/1 ratio $SiO_2/NaO_2$), calcium carbonate, bentonite clay, and zinc oxide and said envelope having a diameter sufficient to fill said aperture in said partition so as to provide a flexible permanent seal between said conduit and said partition.

21. A structure providing a fire-resistant seal between a conduit and a partition through which the conduit passes, comprising a rigid tubular sleeve imbedded in a partition having a conduit to extend therethrough, a flexible boot connecting each end of said sleeve to said conduit, and an intumescible thixotropic silicate slurry comprising a slurry composition that foams at temperatures above 250° F., with subsequent hardening, comprising sodium silicate (39.2% to 39.8% by weight) solution of 42° Baume, (3.22/1 ratio of $SiO_2/NaO_2$), calcium carbonate, bentonite clay, and aluminum hydroxide between said conduit and said boots, so as to provide a flexible permanent seal between said conduit and said partition.

22. A structure providing a fire-resistant seal between a conduit and a partition through which the conduit passes, comprising a flexible envelope surrounding a conduit in a partition and extending logitudinally along said conduit at least the distance of the thickness of said partition, said envelope being filled with an intumescible thixotropic silicate slurry composition that foams at temperatures above 250° F., with subsequent hardening, comprising sodium silicate (39.2% to 39.8% by weight) solution of 42° Baume, (3.22/1 ratio $SiO_2/NaO_2$), calcium carbonate, bentonite clay, and aluminum hydroxide and said envelope having a diameter sufficient to fill said aperture in said partition so as to provide flexible permanenet seal between said conduit and said partition.

23. A structure providing a fire-resistant seal between a conduit and a partition through which the conduit passes, comprising a rigid tubular sleeve imbedded in a partition having a conduit to extend therethrough, a flexible boot connecting each end of said sleeve to said conduit, and an intumescible thixotropic silicate slurry comprising a slurry composition that foams at temperatures above 400° F., with subsequent hardening, comprising hydrated sodium silicate powder (2/1 to 3.22/1 ratio $SiO_2/Na_2O$), glycerol, calcium carbonate, zirconium oxide, and bentonite clay between said conduit and said boots, so as to provide a flexible permanent seal between said conduit and said partition.

24. A structure providing a fire-resistant seal between a conduit and a partition through which the conduit passes, comprising a flexible envelope surrounding a conduit in a partition and extending longitudinally along said conduit at least the distance of the thickness of said partition, said envelope being filled with an intumescible thixotropic silicate slurry composition that foams at temperatures above 400° F., with subsequent hardening, comprising hydrated sodium silicate powder (2/1 to 3.22/1 ratio $SiO_2/Na_2O$), glycerol, calcium carboonate, zirconium oxide, and bentonite clay and said envelope having a diameter sufficient to fill said aperture in said partition so as to provide a flexible permanent seal between said conduit and said partition.

25. A structure providing a fire-resistant seal between a conduit and a partition through which the conduit passes, comprising a rigid tubular sleeve imbedded in a partition having a conduit to extend therethrough, a flexible boot connecting each end of said sleeve to said conduit, and an intumescible thixotropic silicate slurry comprising an aqueous sodium silicate solution, a polyvalent metal oxide or hydroxide, and a thixotropic agent between said conduit and said boots, so as to provide a flexible permanent seal between said conduit and said partition.

26. A structure providing a fire-resistant seal between a conduit and a partition through which the conduit passes, comprising a rigid tubular sleeve imbedded in a partition having a conduit during its construction to extend therethrough, a flexible boot connecting each end of said sleeve to said conduit, and an intumescible thixotropic silicate slurry, comprising a slurry composition that foams at temperatures above 150° F., with subsequent hardening, comprising sodium silicate (39.2% to 39.8% by weight) solution of 42° Baume, (3.22/1 ratio $SiO_2/NaO_2$), calcium carbonate, bentonite clay, and a polyvalent metal oxide or hydroxide between said conduit and said boots, so as to provide a flexible permanent seal between said conduit and said partition.

* * * * *